Feb. 9, 1960 A. D. LIDDERDALE 2,924,328
APPARATUS FOR CONTROLLING LONGITUDINAL
MOVEMENT OF CABLES AND THE LIKE
Filed Dec. 2, 1957 2 Sheets-Sheet 2
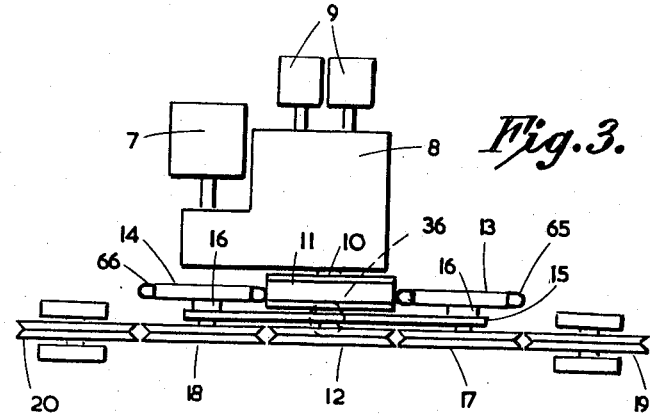
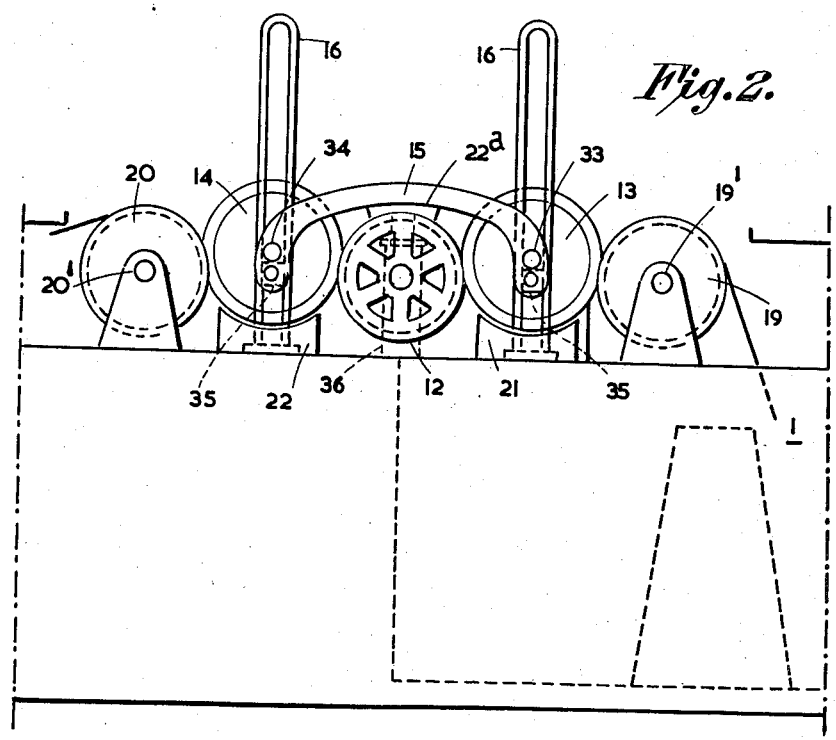
Inventor:
Aubrey Douglas Lidderdale
By his attorneys:
Baldwin & Wight United States Patent Office 2,924,328
Patented Feb. 9, 1960

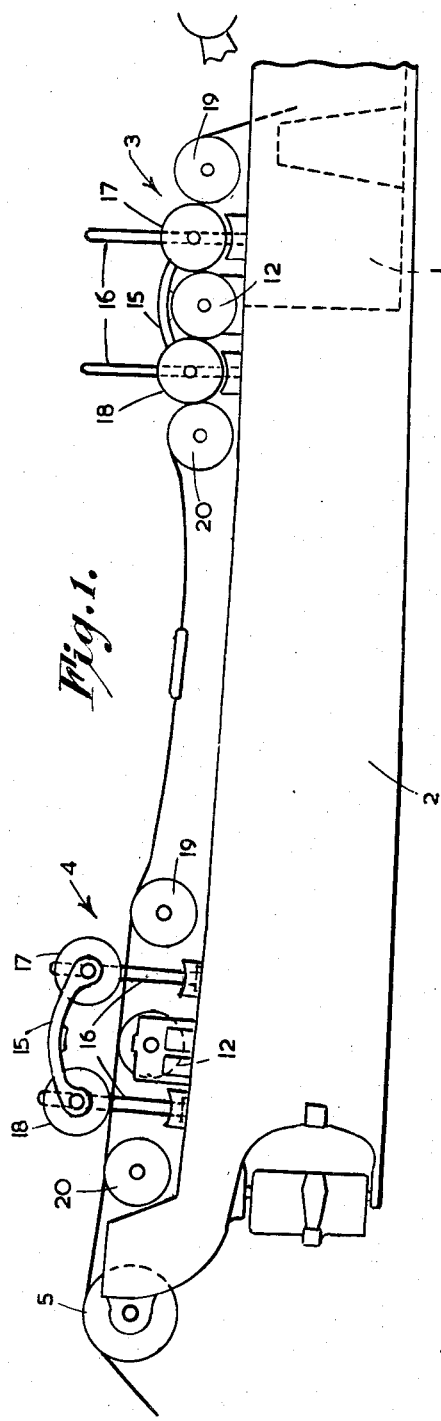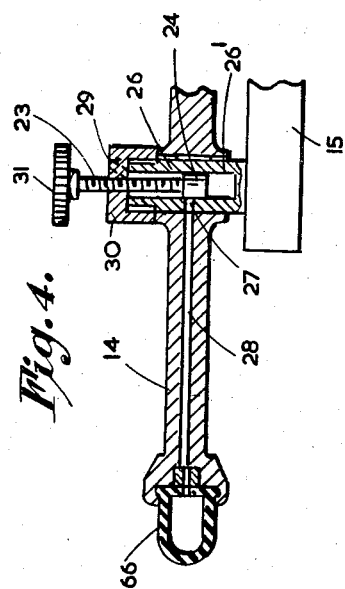

2,924,328
APPARATUS FOR CONTROLLING LONGITUDINAL MOVEMENT OF CABLES AND THE LIKE

Aubrey Douglas Lidderdale, Bromley, England, assignor to The Telegraph Construction & Maintenance Company Limited, London, England, a corporation of Great Britain Application December 2, 1957, Serial No. 700,041

Claims priority, application Great Britain December 3, 1956

9 Claims. (Cl. 203—200)

The present invention relates to torque transmitting means and especially concerns torque transmitting means for use in controlling the longitudinal movement of submarine cables and the like, particularly when used in conjunction with electrical repeaters.

When laying down or taking up a submarine cable from a cable ship it is necessary to provide some form of tensioning device to maintain continuous control of the cable as it is being paid out from, or hauled in to, storage tanks in the ship.

The known types of submarine cable tensioning device which are used in such cable laying apparatus have either cooperating caterpillars or a series of sheaves which have fixed centres relative to one another and which move as a unit. Such tensioning devices perform their task adequately but are complicated by the difficulties which arise when the repeater housing or other object of a diameter greater than that of the cable is encountered. Means to overcome this difficulty is described in the co-pending application of Aubrey Douglas Lidderdale and Harold Walmsley, Serial No. 697,930, filed November 21, 1957.

It is an object of this invention to provide means for transmitting a driving or braking action between two shafts forming part of apparatus for laying down or picking up submarine cables, in which the degree of transmission of torque may be varied whilst the device is in operation, particularly so as to vary the upper limit of the amount of torque transmitted.

According to a preferred embodiment of the present invention in apparatus for laying or picking up submarine cables, a unit for transmitting torque between a driving or braking shaft and a driven shaft or shafts, comprises an inflatable member connected to either one or the other or to both of the driving and driven shafts and when partially inflated, in frictional contact with the other of said shafts whereby variations in the pressure of the fluid within the inflatable member provides the resultant variation in the torque transmitted by the driving or braking shaft to the driven shaft or shafts, and thus in addition varying the velocity ratio between the two shafts.

Preferably the inflatable member comprises a tube of resilient material which tube is carried by the driven shaft, the driving shaft having a drum attached thereto in frictional contact with the said tube when this is partially inflated.

The means to inflate the tube may comprise a bore in the shaft on which the tube is mounted, the bore being in connection with a fluid pressure supply, a tapping from an orifice in the shaft leading to the inflatable tube and a piston sliding in the bore whereby connection between the tapping and the bore may be opened or closed as desired, by movement of the piston across said orifice.

Two driven shafts are preferably provided for each unit, each shaft having an inflatable tube mounted thereon and each tube, when partially inflated, making contact with the driving or braking shaft. In this arrangement the two driven shafts may have different maximum torques transmitted thereto from the driving shaft depending on the degree of inflation of the tubes, the greater the degree of inflation the greater being the torque transmitted.

Preferably the two driven shafts have a pulley or sheave attached at one end thereof and in the same plane as an operating pulley or sheave attached to the driving or braking shaft, a submarine cable being passed round one driven sheave over the operating sheave and finally under the second driven sheave, whereby the cable is given sufficient tension by the driven sheaves to ensure that efficient braking or hauling of the cable is carried out by the operating sheave. The arrangement is such that the tension in the cable is progressively diminished thus obviating the risk of damage to the cable from the application of an excessive tension at any one time.

Preferably two units for transmitting torque are provided in line with, but spaced apart from, one another on the deck of the cable laying ship.

The invention is illustrated in the accompanying drawings, in which:

Figure 1 is a schematic view of a cable laying ship showing the general disposition of multiple sheave units according to this invention, forming part of apparatus for laying or picking up submarine cables, Figures 2 and 3 are respectively a side elevation on an enlarged scale of one unit, the three central sheaves being omitted in Figure 2, and a plan view, Figure 4 is a part sectional elevation of one driven pulley having means for inflating the tube.

Referring to the drawings a submarine cable to be laid is stored in tanks 1 in the hold of a cable laying ship, generally indicated at 2, and is fed therefrom to the first of two braking or driving units indicated respectively at 3, 4, on the ship's deck. From unit 3 the cable passes through unit 4 and thence to a stern sheave 5 in line with the braking units and over which the cable is lowered into the water, both units operating to control the rate at which the cable is paid out and also supporting the dead load of the cable as it is being lowered to the sea bottom.

Each braking or driving unit comprises a motor 7 (see Figure 3), reduction gearing 8 which is capable of reversing movements and which may conveniently be a Telcon-Hindmarsh gear unit, and a braking device including a water-cooled band brake and hydraulic brakes 9. The output shaft 16 of the reduction gear unit 8 is coupled to a capstan drum 11 and directly drives an operating feed pulley or sheave 12.

The sheave 12 is one of a series of five sheaves 12, 17, 18, 19 and 20, which make up each of the units 3, 4, the sheave 12 being the centremost. Of the remaining sheaves the two outer sheaves 19 and 20 remain stationary, being mounted to revolve about fixed axes 19', 20', in horizontal alignment with that of the operating sheave 12.

The two inner sheaves 17, 18 function as the control sheaves in the unit since during the laying or paying out operation the path of the cable is over the two outer sheaves 19 and 20 and below the sheaves 17 and 18 and over the operating sheave 12. Whilst the disclosed arrangement includes three lower sheaves 19, 12 and 20, and two upper sheaves 17 and 18, it will be appreciated that the essential series of sheaves may be constituted for example by two outer sheaves 17 and 18 and an intervening central sheave 12.

As will hereinafter be explained both of the sheaves 17 and 18 are capable of displacement to a position above the three sheaves 12, 19 and 20, to enable the cable to take a straight line path over the sheaves and thus permit the passage of a repeater housing.

In addition the speed at which the two inner or control sheaves 17 and 18 revolve is capable of control.

For this purpose there is associated with each of the inner sheaves 17, 18 driven wheels 13 and 14. The driven wheels or members 13, 14 and their respective sheaves 17, 18 are fast on driven shaft means 33, 34, these shafts being journalled to rotate in guide blocks 35 movable in vertical guideways 16 arranged in parallel vertical planes. Movement of the guide blocks 35 and thus of the sheaves 17 and 18 is controlled by an interconnecting beam 15, means such as a hydraulic jack indicated at 36 being provided for raising and lowering the beam 15. The operation and function of the inner sheaves 17 and 18 is similar to the arangement which forms the subject-matter of the aforementioned application Serial No. 697,930.

The outer guide sheaves 19, 20 which remain in alignment with the operating sheave 12 provide means whereby the tension of the cable may be measured in conjunction with for example a load cell dynamometer such as that described in the co-pending application of Aubrey Lidderdale, Serial No. 697,117, filed November 18, 1957.

In operation the cable is fed from the tanks over the first guide sheave 19 of the unit 3 under the first tension control sheave 17 over the operating sheave 12 under the second tension control sheave 18 and over the second guide sheave 20 from whence it passes to a second braking unit 4 similar to that already described, to the stern sheave 5.

In addition to the braking action exerted through the sheaves 17, 18 an emergency clamping brake may be provided for use in connection with each unit to hold the cable against movement.

It will be obvious that such an emergency brake may take various forms and in one brake mechanism, brake blocks 21, 22 are associated with each of the control sheaves 17, 18. These brake blocks may be movable radially towards and from the sheaves 17 and 18 so as to grip the cable in its passage below the sheaves.

In an alternative arrangement the blocks 21, 22 may be fixed and the braking pressure may be applied by movement of the sheaves 17, 18 themselves through the connecting frame 15. Thus when the outer sheaves 17, 18 have been shifted in a plane normal to the axes of the sheaves, i.e., lowered to their operative position, further movement of the connector frame 15 will lower the sheaves to a position where the cable will be firmly gripped between the periphery of the sheaves and their respective brake blocks 21, 22.

In this arrangement it may be necessary to provide means for adjusting the position of the brake blocks in order to take up any wear. If desired a third or central block 22ª may be mounted on the connecting frame 15 for applying braking pressure to the main driving or central sheave 12.

As explained more fully in connection with co-pending application of Aubrey Lidderdale, Serial No. 697,117, filed November 18, 1957, the provision of the two braking or driving units 3, 4 enables the moving cable to be controlled by one of the units whilst the movable sheave assembly of the other is raised to admit the passage therethrough of a submarine repeater or other protuberance whereafter the movable sheave assembly of the first unit takes up control of the cable and the movable sheave assembly of the other unit is raised to allow the passage of the repeater housing through it (see Figure 1). In this way rigid repeater housings of any diameter or length may be passed through the control units without having to stop the ship.

Again if it is required to splice the end of the cable which has just been paid out from a tank to the end of a cable already laid, such cable ends can be held on by each unit whilst the splicing or joining operations are carried out, and finally lowered away from the ship by the use of both units in conjunction with rope stoppers or the like.

When paying out cable the driven sheave 17 nearest to the cable hold 1 (see Figure 1) must provide holding back characteristics so as to ensure that the operating pulley 12 provides the maximum braking effect possible and that the minimum amount of slip of the cable around the perimeter thereof occurs.

The tensions in the cable on either side of the operating sheave 12 may be varied according to the relative braking effects on the cable exerted by the respective tension pulleys 17, 18 on the cable. This variation in braking torque may be achieved by variation of fluid pressure within the inflatable tubes, which variation in pressure allows a change in the transmission of torque from the output shaft 10 to the driven shafts 33, 34 and their associated sheaves 17, 18.

Thus each braking sheave in turn may be arranged to have a holding back effect in relation to the next succeeding sheave by adjusting the fluid pressure within the inflatable tube parts 65, 66 so that a maximum torque limit of each sheave is related to the correct maximum braking torque which it is required to provide.

The braking of the operating sheave is achieved by the water-cooled brake and a hydraulic brake 9. An electrical generator may be provided for use in conjunction with the Telcon-Hindmarsh gear unit, the arrangement beng such that when the cable is being paid out the drive load is transmitted through the Telcon-Hindmarsh gear to the generator to produce electricity which may then be used to meet the ship's needs, thus saving fuel.

When it is desired to haul in the cable the direction of rotation of the driving shaft is changed and the reduction gearing is reversed, the motor through the gear unit provinding a drive rather than a braking action. The whole apparatus however functions in a similar way to that described in the paying out or laying operation.

The operating pressure of the pneumatic tires or tubes 65, 66 fitted to the driven wheels 13 and 14 may be adjusted by any suitable means. Inflation of the tubes 65, 66 may be from a source of compressed air or by means of an air pump and in the arrangement shown in Figure 4, air pressure is transmitted to the tube 66 through a central duct 28 formed in the body of the wheel, this duct 28 being in communication with a port 27 in a hub element 26 on which the wheel 14 is mounted to revolve, the hub 26 having a central bore 26' in which is slidable a plunger 24 so that the port 27 may be opened and closed according to the position of the plunger.

An end cap 30 is fitted over the boss and is provided with a drilling 29 for connection to the source of compressed air and for which purpose it may be screw-threaded to receive the nozzle of a pressure line or alternatively it may be fitted with a standard valve of the Schrader type.

Connected to the plunger 24 is a threaded spindle 23 which extends through a threaded opening in the cap 30 and is provided at its outer end with a knurled head 31.

It will be obvious therefore that by rotation of the head 31 the position of the plunger 24, which operates as a valve, may be adjusted either to reduce the pressure in the tube 15 or to open the port 27 when it is desired to increase the inflation pressure.

What is claimed is:

1. In apparatus for laying out or hauling in a submarine cable having, at intervals, protuberances which exceed the normal cross section of the cable, a control device comprising a series of at least three sheaves including two outer sheaves which together constitute a first sheave means, and a central sheave between said outer sheaves and which constitutes a second sheave means; means mounting said sheaves to rotate about spaced parallel axes and in substantial alignment in a plane normal to said axes for receiving a cable passing under the two outer sheaves and over said central sheave; means for shifting the mounting means of one of said sheave means transversely of said axes and substantially in said plane to effect a relative displacement between said first sheave means and said second sheave means whereby to permit relatively free passage of said cable between said outer and central sheaves; first torque transmitting means connected to one of said sheave means; and variable speed and torque transmitting means operatively connected between said first torque transmitting means and the other of said sheave means whereby the ratio of the torque transmissions related respectively to said outer sheaves and said central sheave may be varied.

2. Apparatus as set forth in claim 1 in which said variable speed and torque transmitting means comprises a first member rotatable with one of said sheave means; and a second member rotatable with the other of said sheave means and frictionally engaging said first member.

3. Apparatus as set forth in claim 2 in which one of said members comprises a circular inflatable part frictionally engaging the other of said members.

4. Apparatus as set forth in claim 3 including means for variably inflating said inflatable part whereby to vary the speed and torque transmitting characteristics of said two members.

5. Apparatus as set forth in claim 3 in which the mounting means for a sheave of one of said sheave means mounts said last named sheave for rotation about a fixed axis, said apparatus including means for driving said last named sheave, and the shifting of the other of said sheave means transversely of said axis separating said members from frictional engagement with one another without disconnecting said last named sheave from said driving means.

6. Apparatus as set forth in claim 1 including a shaft rotatable about a fixed axis and on which said central sheave is mounted, and in which the means mounting said outer sheaves comprises separate shafts respectively for said outer sheaves and a shiftable frame on which said separate shafts are mounted.

7. Apparatus as set forth in claim 6 including power operated means for driving said first mentioned shaft.

8. Apparatus as set forth in claim 6 including braking means for retarding rotation of said first mentioned shaft.

9. Apparatus as set forth in claim 6 including braking means for retarding rotation of said outer sheaves.

References Cited in the file of this patent

UNITED STATES PATENTS

| 2,756,872 | Hartley | July 31, 1956 |

FOREIGN PATENTS

| 17,634 | Great Britain | Aug. 10, 1896 |
| 123,482 | Great Britain | Feb. 27, 1919 |
| 355,002 | Great Britain | Aug. 20, 1931 |